(12) United States Patent
Uribe-Etxebarria Jimenez

(10) Patent No.: US 8,745,194 B2
(45) Date of Patent: Jun. 3, 2014

(54) SYSTEM AND METHOD OF INTEGRATING REMOTE SERVICES

(75) Inventor: Xabier Uribe-Etxebarria Jimenez, Bizkaia (ES)

(73) Assignee: Xabier Uribe-Etxebarria Jimenez, Algorta, Getxo, Bizkaia (ES)

( * ) Notice: Subject to any disclaimer, the term of this patent is extended or adjusted under 35 U.S.C. 154(b) by 197 days.

(21) Appl. No.: 13/468,723

(22) Filed: May 10, 2012

(65) Prior Publication Data

US 2013/0204993 A1 Aug. 8, 2013

(30) Foreign Application Priority Data

Feb. 6, 2012 (EP) ..................................... 12382044

(51) Int. Cl.
*G06F 15/16* (2006.01)
*G06F 12/00* (2006.01)

(52) U.S. Cl.
USPC ......................................................... 709/223

(58) Field of Classification Search
USPC .................. 709/203, 223–229, 217–218, 250
See application file for complete search history.

(56) References Cited

U.S. PATENT DOCUMENTS

| | | | |
|---|---|---|---|
| 7,603,291 B2 * | 10/2009 | Raiyani et al. ............... | 705/26.7 |
| 7,729,953 B2 | 6/2010 | Pandurangan | |
| 7,912,852 B1 | 3/2011 | McElroy | |
| 8,290,977 B2 * | 10/2012 | Chinchwadkar et al. ...... | 707/778 |
| 8,468,244 B2 * | 6/2013 | Redlich et al. ................ | 709/225 |
| 8,489,598 B2 * | 7/2013 | Rhoads et al. ................ | 707/736 |
| 8,572,411 B2 * | 10/2013 | Ginter et al. .................. | 713/194 |
| 2007/0011104 A1 | 1/2007 | Leger et al. | |
| 2010/0169161 A1 | 7/2010 | Sacco | |
| 2011/0148924 A1 | 6/2011 | Tapley et al. | |

OTHER PUBLICATIONS

Web Service, Wikipedia, Jan. 9, 2012.
iPhone 4S, Wikipedia, Feb. 5, 2012.

* cited by examiner

*Primary Examiner* — Zarni Maung
(74) *Attorney, Agent, or Firm* — Tristan A. Fuierer; Moore & Van Allen, PLLC

(57) ABSTRACT

The present invention relates to a system of integrating remote services and the method of operating said system. In a preferred embodiment, the system comprises a management system, a database with a table of users and a table of data associated with each user, a message input and recognition system for written messages, voice messages, or text messages, etc., an output system, a dialogue system, and an information exchanging system for exchanging information with remote third party services, where the information exchanging system is connected to the management system and comprises connectors suitable for each type of service such that at least one connector is suitable for performing a commercial transaction that can be requested by the user. It is particularly applicable in the field of purchasing electronic tickets or products and in the field of bank transactions from a mobile terminal.

16 Claims, 13 Drawing Sheets

FIG. 3A

Step 1 — Registration
Step 2 — Social Network
Step 3 — Banking
Step 4 — Travel
Step 5 — Health
Step 6 — Shopping Personal data of the user Name *
First last name
Second last name
VAT Number
Date of Birth
Telephone
Contact Address
Home Address
Post Code
City
Province / State Password *
Repeat password *
E-mail *
Country *

Save

BACK    NEXT

SYSTEM AND METHOD OF INTEGRATING REMOTE SERVICES

CROSS REFERENCE TO RELATED APPLICATIONS

This application claims priority under 35 U.S.C. §119(a) of European Patent Application No. EP12382044.1 for "System and Method of Integrating Remote Services" filed on Feb. 6, 2012 in the name of Xabier URIBE-ETXEBARRIA JIMENEZ, which is incorporated herein in its entirety.

OBJECT OF THE INVENTION

The present invention describes a system of integrating remote services and the operating method of said system. In a preferred embodiment the system comprises a management system, a database with at least one table of users and at least one table of data associated with each user, a message input and recognition system for written messages, voice messages, or gestures, push-button, NFC, etc., an output system, a dialogue system, and an information exchanging system for exchanging information with the remote third party services, where the information exchanging system is connected to the management system and comprises at least one connector suitable for each type of service or information such that at least one connector is suitable for performing a commercial transaction that can be requested by the user. Therefore an integrated payment or data consulting system connected to third party services and to the management system is provided for either executing and paying for or consulting services or information requested by the user. The possibility that third party systems can connect to the system by means of connectors so that users can access products, services and/or information of said third party systems through the system is also provided. It is particularly applicable in the field of purchasing electronic tickets or products from a mobile terminal (mobile telephone, netbook, computing device, tablet, laptop, or any other type of device) and accessing information or other services such that accessing various services, interpreting the natural language and integrating objective data with personal data of a user is integrated by means of a single system.

BACKGROUND OF THE INVENTION

The main technical problem for the invention is that it is currently possible to access various remote services by voice and/or natural language but always independently. Thus, for example, it is possible to purchase cinema tickets, purchase an airline ticket or consult bank data from any mobile terminal, computing device, tablet, computer or any other type of device which has Internet access. There are also applications which interpret voice messages. U.S. Pat. No. 5,426,583 which describes a natural language interpreting system (automatic translation) and also going from voice to text with voice recognition is known in this regard.

No integrated system giving access to any service irrespective of the type of service, in which at least one of the services is a commercial transaction, i.e., which is an integrator of transaction services/products with natural language and/or recognition of voice gestures, NFC or any other type of message is known. Information services in mobile telephones by means of Internet access, or services which integrate locating the terminal with other applications, for example foursquare, in which the users register and check-in in premises, places and are awarded points in return are known. However today there is no application which allows accessing multiple services among which at least one of them includes performing a commercial transaction with natural language and/or recognition of voice, gestures, etc., from a single system or web page. Furthermore, no system which allows performing this type of transactions by voice and natural language from a device is known.

Furthermore, neither is the possibility of allowing any third party to incorporate itself into a system by means of connectors available in the system so that any third party can incorporate itself into the system and thus any user can access said product, information and/or service of the third party with the advantages of the system such as natural language processing and/or recognition of voice, gestures, NFC or any other type of message, known.

DESCRIPTION OF THE INVENTION

Therefore, the present invention presents a system of integrating remote services in a first inventive aspect comprising:

a. a management system connected to a communications network, A management system is provided which in one embodiment is one or several servers, in the event of being several servers, arranged in the same location or in remote locations with respect to each other, having access to Internet for example. As its name suggests, this management system manages the business logic. It interacts with the remaining components, managing the actions of each of them. It is responsible for giving persistence in the database.

b. a database managed by the management system for maintaining and storing at least the following tables:
a table of users,
a table of data associated with each user, among which high-level information such as account number and social information is distinguished, The management system manages at least one database, which in one embodiment is a non-relational database, for example a Cassandra type database, or a relational database. This database contains the data which the user has been inputting as he/she has been interacting with the system. Thus, for example, the name of the user, preferably with name and last names, objective data, such as address, telephone, date of birth, and in specific embodiments, also occupation, education, religion, ethnic group, nationality, political affiliation, with other high-level information such as account number/numbers of different banks, card information and their keys, login and access password of the different services such as supermarket, online-shop, shopping history, or even health data, weight, height, blood group, or personal or social information, such as family, sentimental relationship (such as "boyfriend/girlfriend", "husband/wife" and data identifying said people), tastes, sexual orientation and sex life, skills, self-esteem, attitude towards life, intelligence quotient, qualities, etc., are available. The database in one embodiment is filled in when registering in the system and it is completed as its information is being used.

The users in various embodiments are people or machines. In other words, humans or machine systems can access the system.

c. a message input and recognition system connected to said communications network for access of at least one user, with capacity to access the management system, for requests input by the user, d. an output system, suitable for at least communicating information to the user or for carrying out actions from a user request, These two systems are provided in the present invention, which in various embodiments are integrated in a single application or in another embodiment are integrated or are remote independent systems with respect to the device of the user.

There are various possibilities in terms of the way of inputting messages. This system is the interface for collecting messages and requests. In one embodiment, it is an application for mobile devices or the like; it can be created for the World Wide Web, for kiosks, for a robot, a domotics display or any device and under any platform. In one embodiment, this system is an integrated message input and recognition system and in another embodiment, it is formed by one system which collects information and another independent system which processes it (for example for going from voice to text).

Thus, in various embodiments, this system collects the message of the user (human or machine) which can be an action triggering a request; or it can be a written request, for example a sentence or part of a written sentence or voice message since the device in that embodiment has a voice-to-text engine. In another embodiment, inputting the message is also by means of NFC (Near Field Communication), wireless technology between close objects, valid for example for identifying, exchanging or collecting data, similar to the RFID card. In various embodiments, the device has a bar code or bi-directional code (Bidi code) reader, and performing the reading of that code is enough to know the function to be performed. In another embodiment, inputting messages is also by facial recognition (for example for accessing information or as a password) or augmented reality (the mobile terminal has a camera and when using it to record something information on what has been recorded is shown in parallel) or by inputting gestures. In one embodiment, the message input and recognition system is capable of detecting any language and the output system responds in said language. In another embodiment, the message input and recognition system is a touch-sensitive system suitable for inputting messages by people with considerable visual deficiency. In another embodiment, this system is suitable for facial recognition, iris recognition, or vein recognition (for example in the hand), access password recognition, or fingerprint recognition or voice recognition and/or frequency or voice activated recognition or any other type of recognition. All these embodiments are characterised by providing a secure system for confirming and authenticating the person performing, where appropriate, a transaction.

In another embodiment, inputting messages is also temperature (through a local or remote temperature measuring system), geolocation and/or GPS (through a local or remote geolocating system integrated with the system), smell, radio, push-button, RFID, Web service or any other type of code.

In another embodiment, inputting the message is also in other formats such as NFC.

In various embodiments, the output system is a system which has several possibilities in terms of the way of displaying messages. Thus, in various embodiments, the messages are a sentence or part of a written or spoken sentence, since the system in that embodiment has a TTS (Text to Speech) voice synthesis system. In various embodiments, the device has a display for showing the bar code or bi-directional code (Bidi code). In another embodiment, the messages are also shown by means of sounds, music, avatar, 3D character, etc. Another embodiment is that of operating a domestic or non-domestic robot, appliance, machine. Operating a health control system (pacemaker, drip, etc.). Another embodiment allows showing the response of the system by means of augmented reality. In another embodiment, the message display is also by means of temperature, geolocation (through a local or remote map system integrated with the system), smell, radio, push-button, RFID, bar code, Web service or any other type of code.

The response can also be a question or a request for the user.

In various embodiments, the message input and recognition system and the output system are installed in the mobile terminal (which in various embodiments is a computing device, tablet, computer, telephone, netbook, or any other type of device) of the user, such that they initially have to be downloaded and executed, either independently or collectively, in the terminal, or this message input and recognition system and the output system are preloaded in the terminal when said terminal is acquired. In another embodiment, said message input and recognition system and output system are accessed remotely, for example through a web page.

e. a dialogue system connected to the management system, where the dialogue system comprises at least one system for interpreting messages, recognising actions to be performed and producing responses given a request input by the user, There is a dialogue system, which in one embodiment includes an application for natural language processing, semantic and ontological analysis with access to the management system and capacity of interaction with it. In one embodiment, a "front-end" or access point is used for the dialogue system for mobile devices, mobile telephone, tablet, computing device, netbook, computer or any other type of device. This front-end is responsible for intercepting the requests sent by the user and where appropriate, returning the appropriate response after processing and producing the corresponding response.

The dialogue system has, among others, the following functions, interpreting the text input by the user, recognising the actions to be performed depending on the input text or request, and composing responses for the user. This dialogue system analyses the input message or request, in one embodiment it also performs natural language processing, semantic and ontological analysis and after extracting the concepts it produces the corresponding responses, which for example in the event that data for a request is missing, the response of the dialogue system is a question addressed to the user or to another dialogue system or another user. In various embodiments, the dialogue system makes a morphological, syntactic, semantic, pragmatic and functional analysis of the message of the user.

f. at least one information exchanging system for exchanging information with the remote third party services, where the information exchanging system is connected to the management system and comprises at least one connector suitable for each type of service such that at least one connector is suitable for performing a commercial transaction that can be requested by the user.

The present system includes an information exchanging system connected to the management system which is an information exchanging system for exchanging information with remote third party services, these services in various embodiments are of many types, the system thus comprises at least one connector suitable for each type of available service and suitable for, such as for example, a connector for purchasing flights, another connector for purchasing products, another connector for purchasing tickets to shows (cinema, theatre, museums), another connector for purchasing vouchers, another connector for consulting bank accounts, another connector for correlating with the GPS position of the terminal, another connector for achieving network information, etc., such that at least one connector is suitable for performing a commercial transaction that can be requested by the user. In other words, the system will have at least one of the connectors suitable for making purchases or payments, transfers, etc. Therefore, an integrated payment system compatible with another data consulting system, which in one embodiment can be in the form of connectors to which the different third party services are connected, is provided. In one embodiment, service providers (banks, supermarkets, etc.) can install and make their applications according to an API (or any communications standard—or non-standard system—or semantic Web standard) provided and thus be integrated with the system. This allows users of said system access to all types of information, products or services provided. In one embodiment, this information exchanging system for exchanging information with remote third party services is a connector in the form of a communication interface between the system and third parties. It must provide the methods necessary for performing the actions ordered by the management system and collecting the return information. In various examples, the connectors can be ad-hoc, i.e., custom developed for the third party, or "generic", such that third parties connect to the system using an API pertaining to said system or a communications standard (or non-standard system) or semantic Web standard (RDF, OWL, SparQL, update, GET (http), Turtle, RDF/XML, Endpoint, etc.) defined by W3C (World Wide Web Consortium) or another organisation or any other type of standard or non-standard communication systems.

In one embodiment, the different services connected to the system can interact with each other as a result of the management system and also with the database for performing more complex actions in which several services take part.

Furthermore the present invention in turn presents in a second inventive aspect a method of integrating remote services carried out in a system comprising:
a. a management system,
b. a database managed by the management system for maintaining and storing at least the following tables:
   a table of users,
   a table of data associated with each user, among which high-level information such as account number and social information is distinguished,
c. a message input and recognition system connected to said communications network for access of at least one user, with capacity to access the management system, for requests input by the user,
d. an output system suitable for at least communicating information to the user or for carrying out actions from a user request,
e. a dialogue system connected to the management system, where the dialogue system comprises at least one system for interpreting messages, recognising actions to be performed and producing responses given a request input by the user,
f. at least one information exchanging system for exchanging information with remote third party services, where the information exchanging system is connected to the management system and comprises at least one connector suitable for each type of service such that at least one connector is suitable for performing a commercial transaction that can be requested by the user and, where the method comprises the following steps:

the user inputting a message in a mobile terminal,
   The user accesses the message input and recognition system in his/her mobile terminal (in various embodiments computing device, tablet, computer, mobile telephone, netbook, or any other type of device) or remotely for example by means of inputting a user name and password in a web page, or in another embodiment the message input and recognition system is already being executed in the mobile terminal, therefore identification is not necessary. A message is therefore input in said terminal, which can be done either by means of voice, or by written text or, as indicated, by NFC, bar or bi-directional codes, facial recognition, augmented reality, etc.

the message input and recognition system recognising the message and transferring it into written text,
   The message input and recognition system recognises that there is a request and changes the format of the request to text, in the event of being by voice or NFC, or by facial recognition, etc.

the dialogue system interpreting the message input by the user and the data necessary for execution,
   The dialogue system receives the message from the user and interprets it. If it is a voice message, it analyses it and translates it from natural language to a machine-identifiable language. The type of request being made and the parameters or data involved are identified. In one embodiment, this dialogue system further carries out a semantic analysis.

the management system identifying availability of necessary data in the database,
   Once the parameters necessary for executing the message or the request have been identified they are communicated to the management system which identifies in the database if said data is available. If all the data necessary for performing the transaction or operation is available, the management system interacts with the information exchanging system for exchanging information with the remote third party services, which can be an integrated payment or data consulting system depending on the request or message of the user.

the management system communicating the unavailable necessary data to the dialogue system, where appropriate,
   In the event that all the necessary data is not available for carrying out the request or message of the user, the management system communicates to the dialogue system the need of inputting additional data. If all the necessary data is available this step would not be necessary.

the dialogue system requesting the additional input of the unavailable necessary data from the user, In the case of the above step of non-availability of data, the dialogue system requests the need of this data from the user.

the user inputting the unavailable necessary data in the mobile terminal in a manner that is spoken or written by the user, In the case of non-availability of data, it will be requested from the user and he/she inputs it by voice or text, NFC, sound, facial recognition or any of the mentioned ways of inputting information. In this case the dialogue system is in turn responsible for interpreting this message, identifying that said data is valid and that all the data necessary for carrying out the initial request has been input.

the management system performing the transaction, either executing and paying for or consulting a service requested in the message input by the user using the data of the database and the data input by the user, Once all the data is available, the management system uses the data of the database (if it requires it) and the data input by the user which initially was not in that database and carries out the transaction or request made. This request can be purchasing a product or booking a service for the user himself/herself or for a third party, and that third party can be a person unrelated to the user or a person who is included in the information database, such as "boyfriend/girlfriend", "mother/father", etc. The request also can also be consulting the balance in a bank account, or in a card, etc. The present invention allows combining all the desired requests of all the services which have been integrated in the system using a single input point.

the dialogue system notifying the user of the transaction success or failure,

The user is informed of the result once the above steps have been carried out.

All the features included in this document (including the claims, description and drawings) and/or all steps of the described method can be pooled together in any combination, with the exception of combinations of mutually excluding features and/or steps.

DESCRIPTION OF THE DRAWINGS

These and other features and advantages of the invention will be seen more clearly in the following detailed description of a preferred embodiment, given only as way of illustrative and non-limiting example, with reference to attached drawings.

FIGS. 3A-3F show embodiments of the displays shown by the service when registering to use the different connectors in the information exchanging system for exchanging information with third parties.

DETAILED DESCRIPTION OF THE INVENTION

The present invention will be described in various preferred embodiments to facilitate better understanding.

Arquitecture

Figure 1:
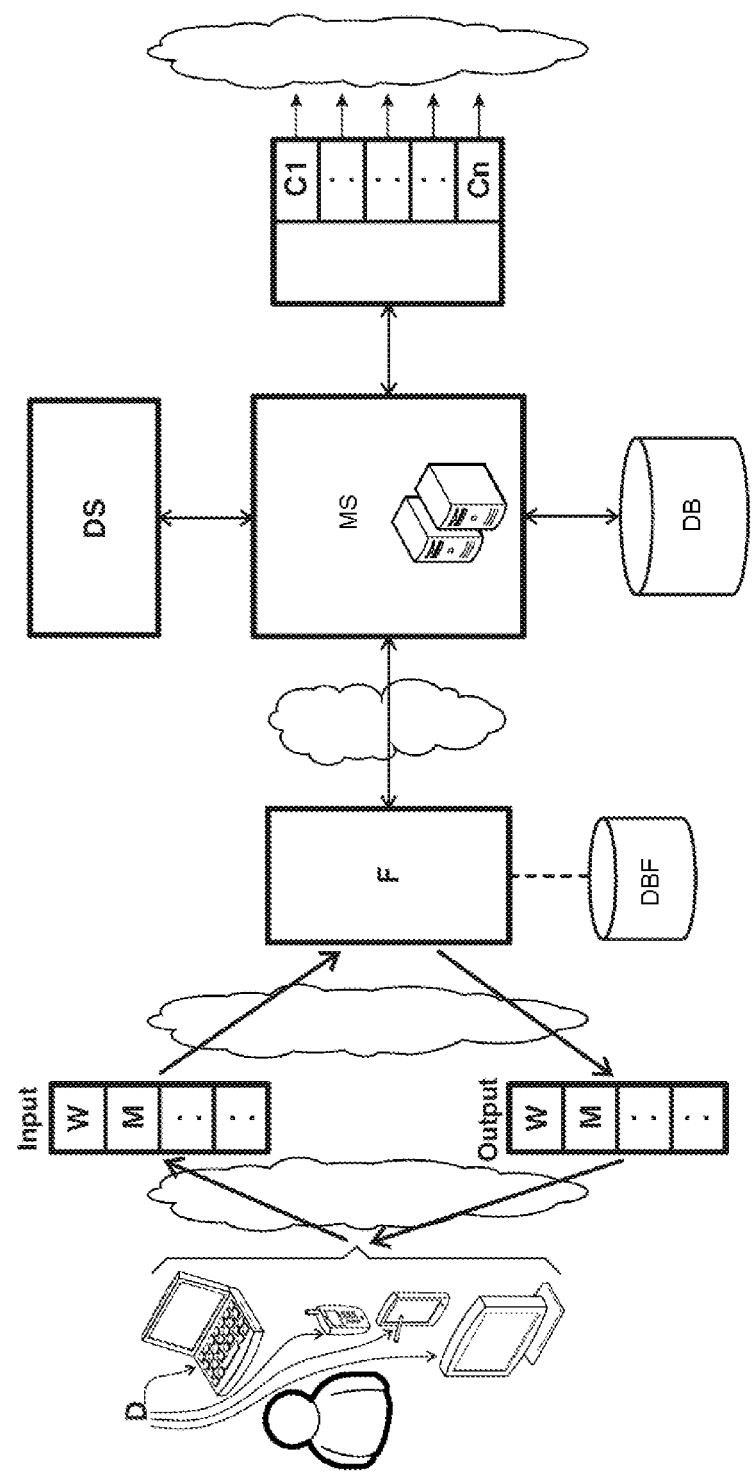
FIG. 1 shows an embodiment of the invention.

FIG. 1 shows an embodiment of the system object of the invention. As indicated, the various elements integrating it are:

a. a management system (MS),
b. at least one database (DB),
c. a message input and recognition system (Input),
d. an output system (Output),
e. a dialogue system (DS), and
f. at least one information exchanging system for exchanging information with the remote third party services (C1-Cn), where the information exchanging system is connected to the management system (MS) and comprises at least one connector (Ci).

All these elements will be described below.

In one embodiment, the management system (MS) has access to a communications network, for example to the Internet. This management system (MS) manages the business logic. It interacts with the remaining components, managing the actions of each of them. It is responsible for giving persistence in the database.

In one embodiment, the database (DB) is a non-relational, Cassandra-type database, although in various embodiments it is also relational, such as MySQL, SQLServer, Oracle, . . . . This database (DB) is managed by the management system (MS) for maintaining and storing at least the following tables:

Table(s) of users,

Table(s) of data associated with each user,

The data which the user has been inputting as he/she has been interacting with the management system (MS) is contained in this database (DB). Thus, for example, the name of the user, preferably with name and last names, objective data, such as address, telephone, date of birth, other high-level information such as account number/numbers in different banks or even health data, blood group, or subjective information, such as family, sentimental relationship (such as "boyfriend/girlfriend", "husband/wife" and data identifying said people), are available. As indicated, the database in one embodiment is filled in when registering in the system and it is completed as its information is being used. Thus, the system in this example stores not only personal data information but also tastes or preferences, for example if a 4-star hotel with a gymnasium and swimming pool has been booked several times, the system will understand that the user likes these hotels and the next time will indicate if he/she wishes to repeat in the preferred hotel.

Furthermore, the system also comprises the message input and recognition system (Input: W, M, . . . ) connected to said communications network for access of at least one user, with capacity to access the management system (MS) for requests input by the user, there is also the output system (Output: W, M, . . . ), suitable for at least communicating information to the user or for carrying out actions from a user request. These two systems are provided in the present invention, which in various embodiments are integrated in a single application, or in another embodiment are integrated or are remote independent systems with respect to the device of the user. In one embodiment, this system is an integrated message input and recognition system and in other example is formed by a system which collects the information and another independent system which processes it (for example for going from voice to text). In the event of being independent the system which collects the information is in the mobile terminal (D)

and the system which processes it can either be in the mobile terminal (D) or in the cloud (remote).

As indicated, there are several possibilities in terms of the way of inputting messages. This system (Input) is the interface for collecting messages and requests. In one embodiment, it is an application for mobile devices or terminals (D) (computing device, tablet, netbook, mobile telephone, laptop, or any other type of device), it can be created for the World Wide Web (W), for kiosks, for a robot, a domotic display, domotic system or any device and under any platform. Thus, in various embodiments, this system (Input) collects the message of the user which can be an action triggering a request; or it can be a written request, for example a sentence or part of a written sentence, or voice message, since the device in that embodiment has a voice-to-text engine, or pressing a button. In another embodiment, inputting the message is also by means of NFC (Near Field Communication), wireless technology between close objects, valid for example for identifying, exchanging or collecting data, similar to the RFID card. In various embodiments, the device has a bar code or bi-directional code (Bidi code) reader, and performing the reading of that code is enough to know the function to be performed. In another embodiment, inputting messages is by facial recognition (for example for accessing information or as a password) or augmented reality or by inputting gestures. The message input and recognition system (Input: W, M, . . . ) is connected to said communications network, for example Internet, for access of at least one user, with capacity to access the management system (MS).

In one embodiment, the message input and recognition system (Input) is capable of detecting any language and the output system (Output) responds in said language. In another embodiment, the message input and recognition system (Input) is a touch-sensitive system suitable for inputting messages by people with considerable visual deficiency. In another embodiment, this system (Input) is suitable for facial or body recognition, iris recognition, or organ or/and vein recognition (for example in the hand), smell recognition, fingerprint recognition, voice or frequency activated recognition, voice recognition. All these embodiments are characterised by providing a secure system for confirming and authenticating the person performing, where appropriate, a transaction.

In another embodiment, inputting messages is also temperature (through a local or remote temperature measuring system), geolocation and/or GPS (through a local or remote geolocating system integrated with the system), smell, radio, push-button, RFID, NFC, Web service or any other type of code.

In various embodiments, the message input and recognition system (Input) and the output system (Output) are installed in the mobile terminal (D) (computing device, tablet, computer or any other type of device) of the user, such that they initially have to be downloaded and executed, either independently or collectively, in the terminal (D), or this message input and recognition system (Input) and the output system (Output) are preloaded in the terminal (D) when said terminal is acquired (D), shown in FIG. 1 such as input and output of type (M). In another embodiment, said message input and recognition system (Input) and output system (Output) is accessed remotely, for example through a web page (W). As indicated, FIG. 1 shows the possible user access points in various embodiments, such as via web (W), by means of an additional application installed in the mobile (M), or in other examples, by means of a fixed terminal of the service (kiosk) itself, any platform device, . . . .

In various embodiments, the output system (Output: W, M, . . . ) is a system which has several possibilities in terms of the way of displaying messages. Thus, in various embodiments, the messages are a sentence or part of a written or spoken sentence, since the system in that embodiment has a TTS (Text to Speech) voice synthesis system. The presentation of the message can also be in other formats such as NFC. In various embodiments, the device has a display for showing the bar code or bi-directional code (Bidi code). In another embodiment, the messages are also shown by means of sounds, music, etc. Another embodiment is that of operating a domestic or non-domestic robot, appliance, machine. Operating a health control system (pacemaker, drip, etc.). Another embodiment allows showing the response of the system by means of augmented reality. In another embodiment, the message presentation is also by means of temperature, geolocation (through a local or remote map system integrated with the system), smell, radio, push-button, RFID, bar code, Web service or any other type of code. The response in various embodiments is a question or a request for the user.

In one embodiment, the dialogue system (DS) responsible for the semantic, language analysis and natural language processing for interpreting service request messages input by the user connected to the management system (MS), where the dialogue system (DS) comprises at least one system for interpreting messages, recognising actions to be performed and producing responses given a request input by the user. The dialogue system (DS) has, among others, the following functions, interpreting the text input by the user, recognising the actions to be performed depending on the text or the input requests, and composing responses for the user. In turn, in various embodiments it incorporates the entire semantic interpreting and ontological analysis logic, as well as extraction of concepts.

In turn, the system also comprises at least the information exchanging system for exchanging information with the remote third party services (connectors) (C1, C2, . . . , Cn), where the information exchanging system is connected to the management system (MS) and comprises at least one connector (Ci) suitable for each type of service such that at least one connector (Ci) is suitable for performing a commercial transaction that can be requested by the user. These connectors (C1, C2, . . . , Cn) can be in different formats: XML, APIs, batch Interface (ftp with flat text), http protocol, Web services, scratching, . . . the connectors in other embodiments are a communication standard (or non-standard system) or semantic Web standard (RDF, OWL, SparQL, SPARQL update, GET (http), POST, Turtle, RDF/XML, Endpoint, etc.) defined by W3C or by any another organisation.

This information exchanging system (C1, C2, . . . , Cn) connected to the management system (MS) is an information exchanging system for exchanging information with remote third party services, these services in various embodiments are of many types, the system thus comprises at least one connector (Ci, Cj, Ck) suitable for each type of available service and suitable for, such as, for example, one connector (Ci) for purchasing flights, another connector (Cj) for purchasing products, another connector for purchasing tickets to shows (cinema, theatre, museums), another connector for purchasing vouchers, another connector for consulting bank accounts, another connector for correlating with the GPS position of the terminal, etc. (a more detailed list is shown in the "Services" section) such that at least one connector (C) is suitable for performing a commercial transaction that can be requested by the user. In addition the system will have at least one of the connectors (Ci) suitable for performing purchases or payments, transfers, etc. Therefore, it has an integrated payment system compatible with another data consulting system, which in one embodiment can be in the form of connectors (C1, C2, ..., Cn) to which the different third party services are connected. In one embodiment, service providers (banks, supermarkets, etc.) can install and make their applications according to the API provided and thus be integrated with the system. As indicated, in other embodiments the connectors can be in XML format, APIs, batch Interface (ftp with flat text), http protocol, Web services, scratching, ... the connectors in other embodiments are a communication standard or semantic Web standard (RDF, OWL, SparQL, etc.) defined by W3C. This allows the users of said system access to all the provided products or services. In one embodiment, this information exchanging system for exchanging information with the remote third party services is a connector (Ci) in the form of a communications interface between the system and third parties. It must provide the methods necessary for performing the actions ordered by the management system (MS) and collecting the return information. In various examples, the connectors (C1, C2, ..., Cn) can be ad-hoc, i.e., custom developed for the third party, or "generic", such that third parties connect to the system using an API pertaining to said system.

In one embodiment, the connector (Ci) is in the form of an open API, and where any remote third party service provider can connect with the system by means of an application compatible with said API. Other embodiments of a connector is XML, as indicated, by means of APIs, batch Interface (ftp with flat text), http protocol, Web services, scratching, with semantic Web standards (RDF, OWL, SparQL, etc.).

Thus, in one embodiment, third party service providers (banks, supermarkets, etc.) can install and make their applications according to the connector (Ci) providing, in the mentioned example, an API, and thus be integrated with the system. This allows the users of the system access to all the provided products or services as well as to any type of information. In one embodiment, this information exchanging system for exchanging information with the remote third party services is a connector in the form of a communication interface between the system and the third parties. It must provide the methods necessary for performing the actions ordered by the management system and collecting the return information.

Figure 2:
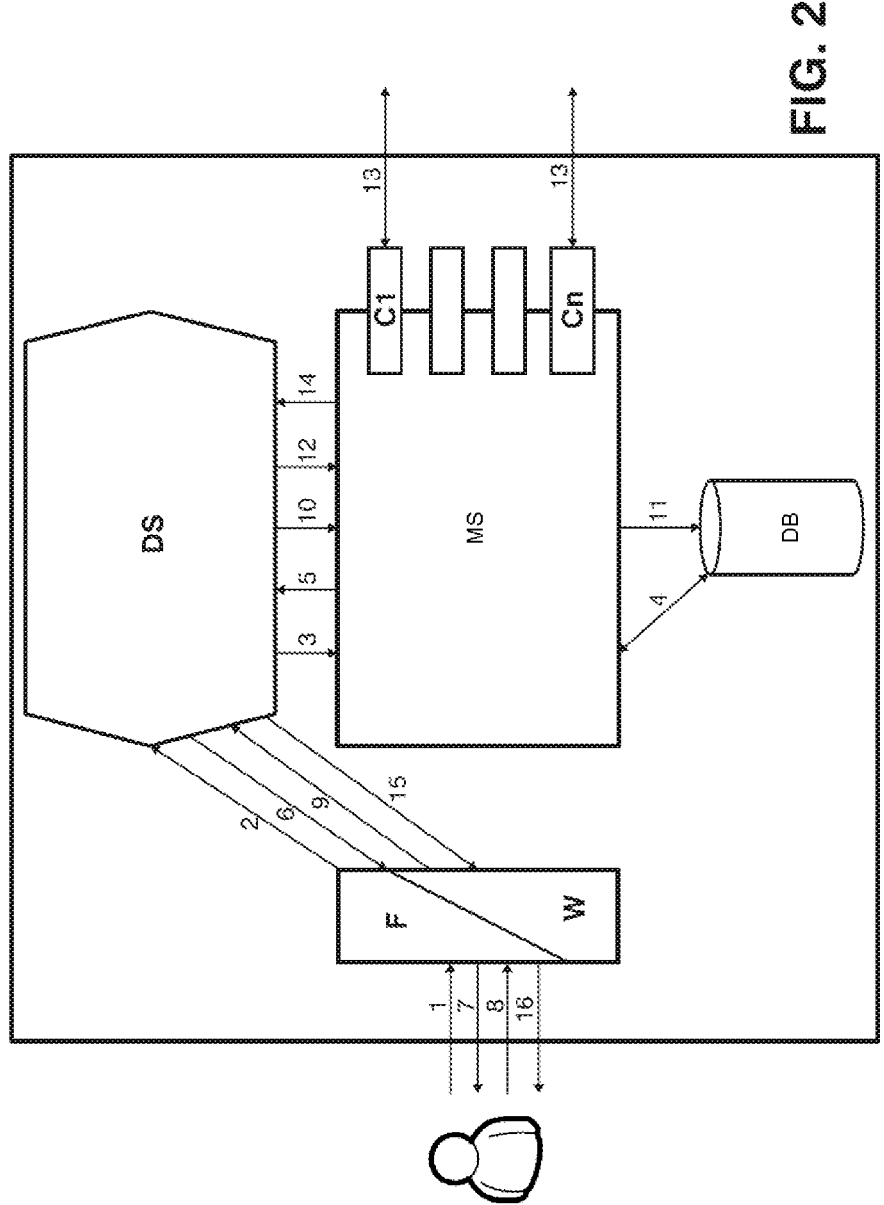
FIG. 2 shows another embodiment of the invention with the different steps carried out given a user request.

In one embodiment, as shown in FIGS. 1 and 2, a "front-end" (F) or access point is used for the mobile (M) or web (W) message input and recognition system. This "front-end" (F) is responsible for intercepting the requests sent by the user and displaying the appropriate response after the corresponding processing. In various embodiments, the front-end (F) receives requests in XML, by batch or by Web service. In the embodiment with a front-end (F), the front-end (F) in another embodiment further comprises an associated database (BDF). This front-end (F) is located in the user access point (FIG. 2) or in another embodiment, such as that of FIG. 1, it is remote.

Details of the Management System

In one embodiment, the management system (MS) is an executable divided into three sections, for the purpose of modularising and simplifying future developments.

A library with all the data access logic. Unique and shared by the different components. The objective is to not have to develop the same data management for each component. Furthermore, by being the single data management point, it allows speeding up problem solving (corrections are made here and not separately in each module).

Business logic of the management system (MS). This is responsible for managing communications with users and with third parties and internally with the dialogue system.

A system monitoring web interface (W). It allows both third parties and internal elements to know statistics about the use thereof and to perform audits of the maintained conversations or information exchanges.

Information Stored in the Database (DB)

Information about the user:
E-mail
Pwd (password)
Name
Last Name
Birthday
Address
City
CP (post code)
State
Country
Photos (photographs of the user)
Telephones
Other additional information.

Furthermore, in other embodiments this information is complemented with:
Occupation
Education
Religion and beliefs
Ethnic group
Nationality
Political affiliation
Account number/numbers in different banks
Card information and their keys
Login and access password of different services such as supermarket, online-shop, etc.
Health data and records
Weight
Height
Blood group
Shopping history
Family
Tastes
    Favourite and disliked film, director, actor, actress, etc.
    Favourite and disliked song, singer, music, etc.
    Meal, foods, drinks, etc.
    Favourite and disliked colour, number,
    Favourite clothes, style,
    Other tastes
Sexual orientation and sex life
Skills
Self-esteem
Attitude towards life
Intelligence quotient
Needs
What the user is searching for
Qualities
Sentimental relationship (such as "boyfriend/girlfriend", "husband/wife" and data identifying said people).
People he/she has met.
Other additional information such as:
    People which the user admires.
    Teachers and mentors he/she has had.

Third Party Information:

Information of the third parties with which the system interacts:

Id
Name
State
Data for Each Third Party Services

At least one table for each type of service in one embodiment. Basic fields which each third party requires. Includes the information which will be requested from the user when he/she registers in the service.

Information Relational:

Relationship between users of the system. The relationship will be established in one embodiment by means of e-mail, which in one embodiment serves as a unique identifier for each user. The relationship categories will be:

Family
  Father
  Mother
  Grandma
  Grandpa
  Brother
  Sister
  Husband
  Wife
  Son
  Daughter
  Boyfriend or Girlfriend or simply Partner
  Other
Friends
  Classmate
  From home town
  Acquaintance
  Other (circles, sports teams, gymnasium, etc.)
Work
  Workmate
  Boss (Direct boss)
  Boss1 (organisational boss)
  Employee (subordinate)
Others The name of the other person is stored for each relationship, and if he/she is registered in the system, his/her e-mail. Thus, the information of the associate is accessed in the event of being necessary.

Information about the User for Each System:

The information about the user is stored in relation to the systems with which he/she interacts. For example, his/her credentials in social networks, his/her current account number in a bank, etc.

Third Parties

In one embodiment, the system interacts with third party systems (social networks, a bank, travel agency, etc., so-called connectors (C1, . . . Cn)). Firstly, compiling information about the user therein and secondly, performing transactions and triggering user events. As indicated, third parties access the system by means of the connectors (C1-Cn) which in various embodiments are an open API, a communications standard (or non-standard system) and/or any transmission protocol (type: GET, POST, PUT, XML, JSON, SOAP, etc.) and/or semantic Web standard (RDF, OWL, SparQL, SPARQL update, GET (http), Turtle, RDF/XML, Endpoint.etc.) defined by W3C and/or by any another organisation.

Event Launcher

In one embodiment, there are processes which must be periodically launched. For example, birthdays have to be checked daily in order to ask the client if he/she wishes to send a notification. A launch interface providing a method responsible for performing periodic work will be used to that end. This method is executed by means of the class responsible for controlling the times in which each action must be executed.

Interaction

In various embodiments, the system offers two ways of interacting with the user:

1.—By means of a web portal (W). From this portal the user can register in the service and use it from a PC.

2.—Mobile (M): The system can be accessed from a mobile application (M). It uses a front-end (F) which is responsible for offering a library of services to said application and processing requests to that end. In a particular embodiment, said front-end (F) is a servlet which receives requests by POST and returns the responses in XML format.

The front-end (F) is capable of returning a response associated with the question asked.

Registration Process

In one embodiment, the registration process in the system is performed following a sequence of actions for assuring that who is registering is really a person, and that the input data is correct. The process can be explained in the next example:

1.—On the registration display, the user will be asked to input an e-mail (which will be his/her identifier in the system) and a password.

2.—The user is asked to fill out a captcha (random numbers or letters generated by the system to be copied by the user in a box) or another type of verification for being certain that an automated attack is not being received.

3.—If the captcha or similar input is correct, a validation e-mail is sent to the user, with a personalised link for continuing to the registration process.

4.—When the user accesses said link, it is certain that the provided e-mail exists, and the process continues.

5.—A voluntary data form is accessed (such as the ones of FIGS. 3A-3F).

Example of Display Diagrams for Registering for Some Products and Services

In one embodiment, to access the web page (W) a simple display is shown which allows logging in to the system, or creating a new account.

1.—If the user logs in and the validation is correct the main display is accessed.

If the log-in data is not correct, the user is requested to input it again.

2.—If the user creates a new account, the validation process seen above is launched. As seen in FIG. 3.

Once registered, a sequence of displays is offered in which he/she can voluntarily input the data which is necessary for each third party of the system.

Figure 3B:
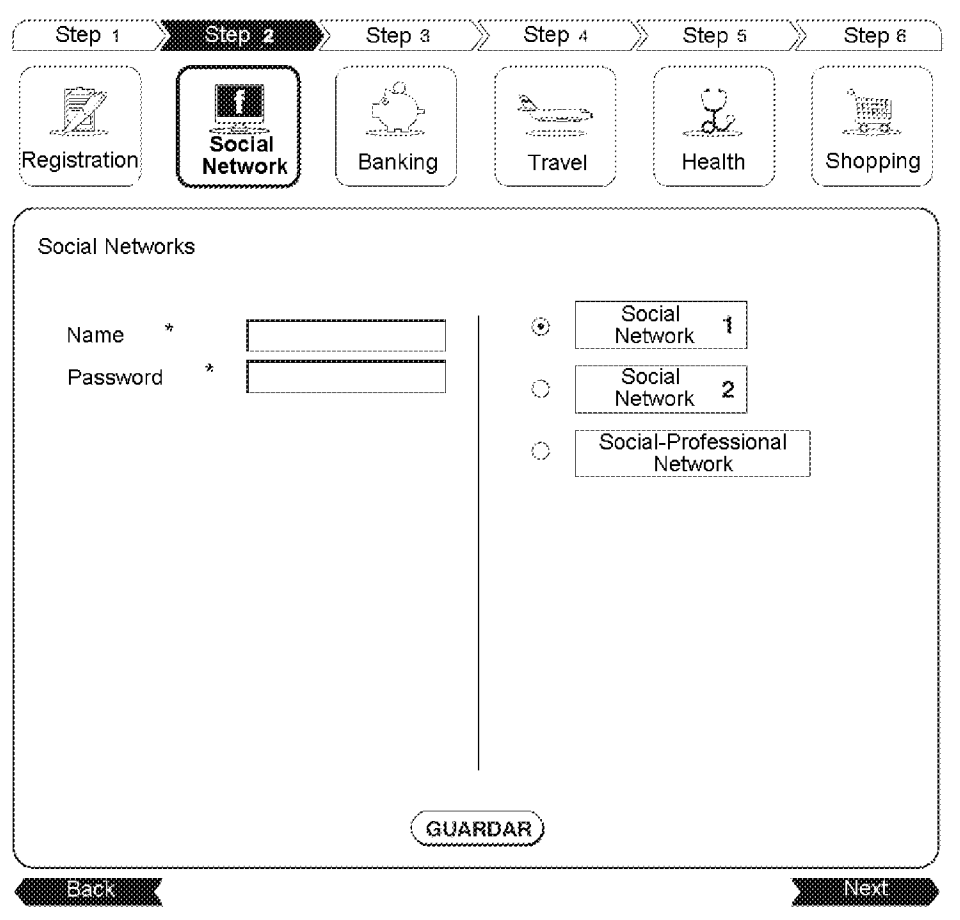
Figure 3C:
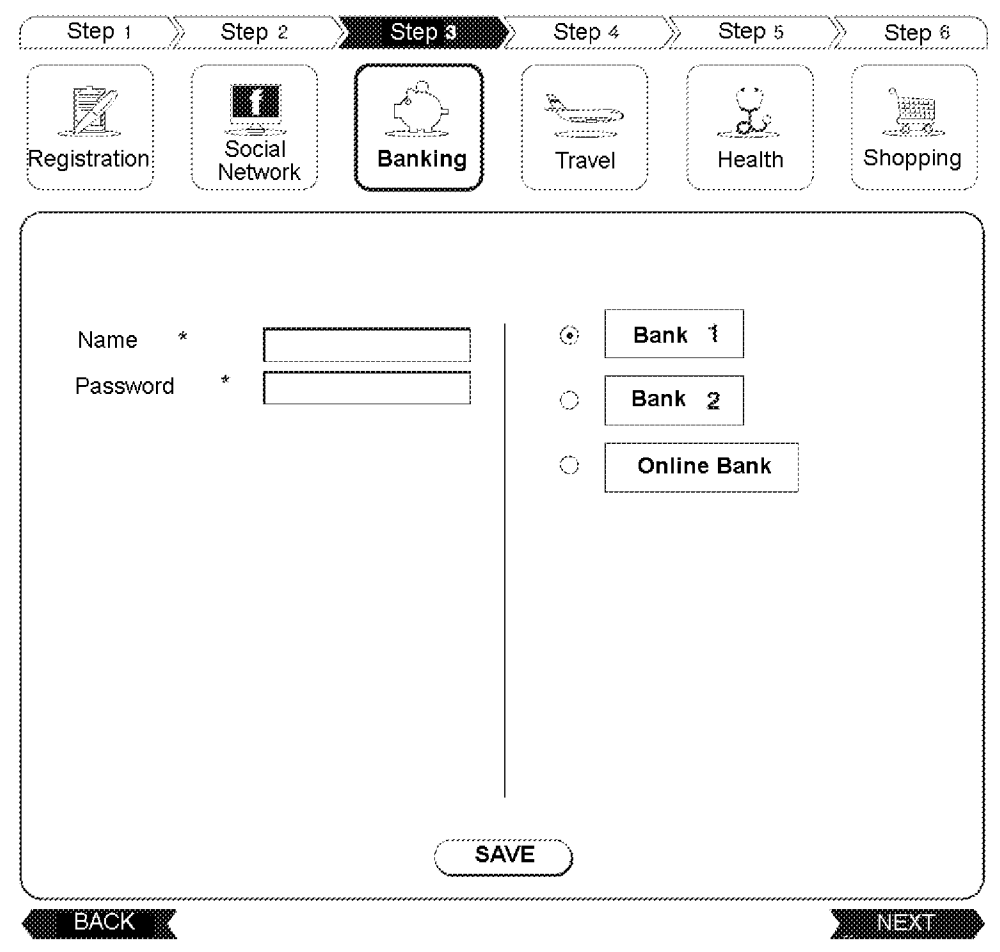
Figure 3D:
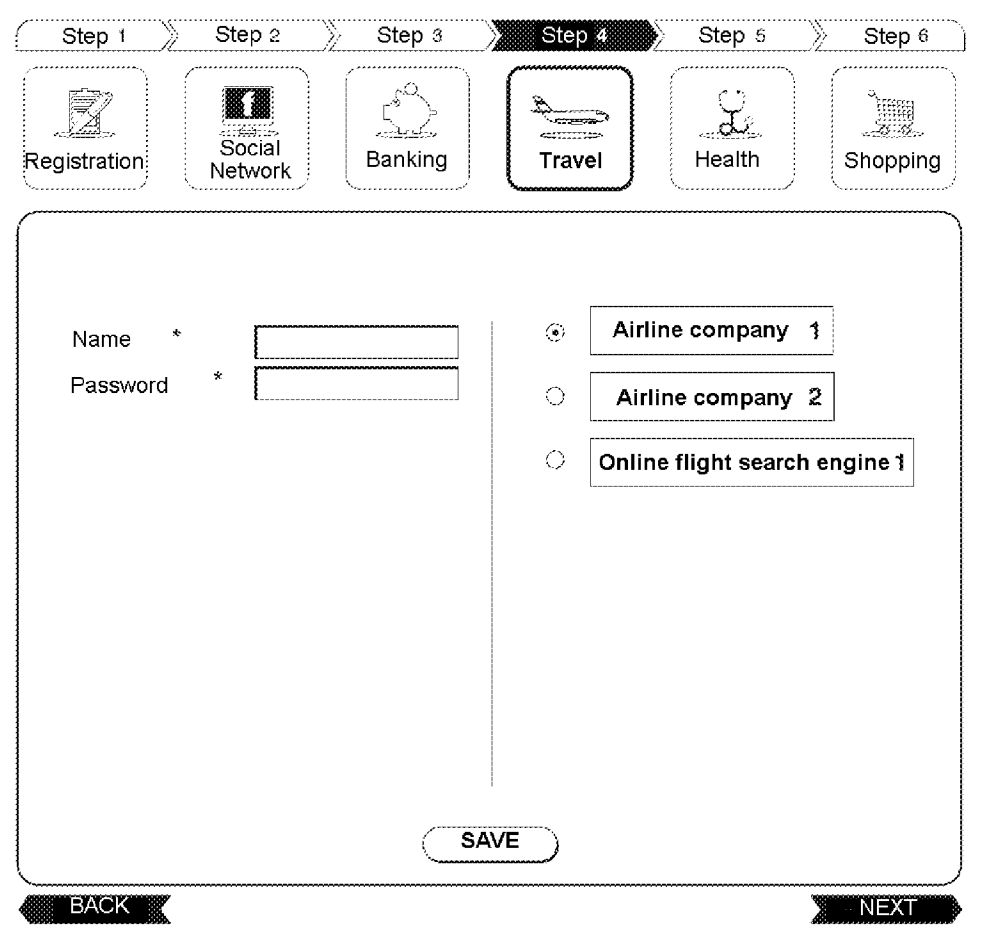
Figure 3E:
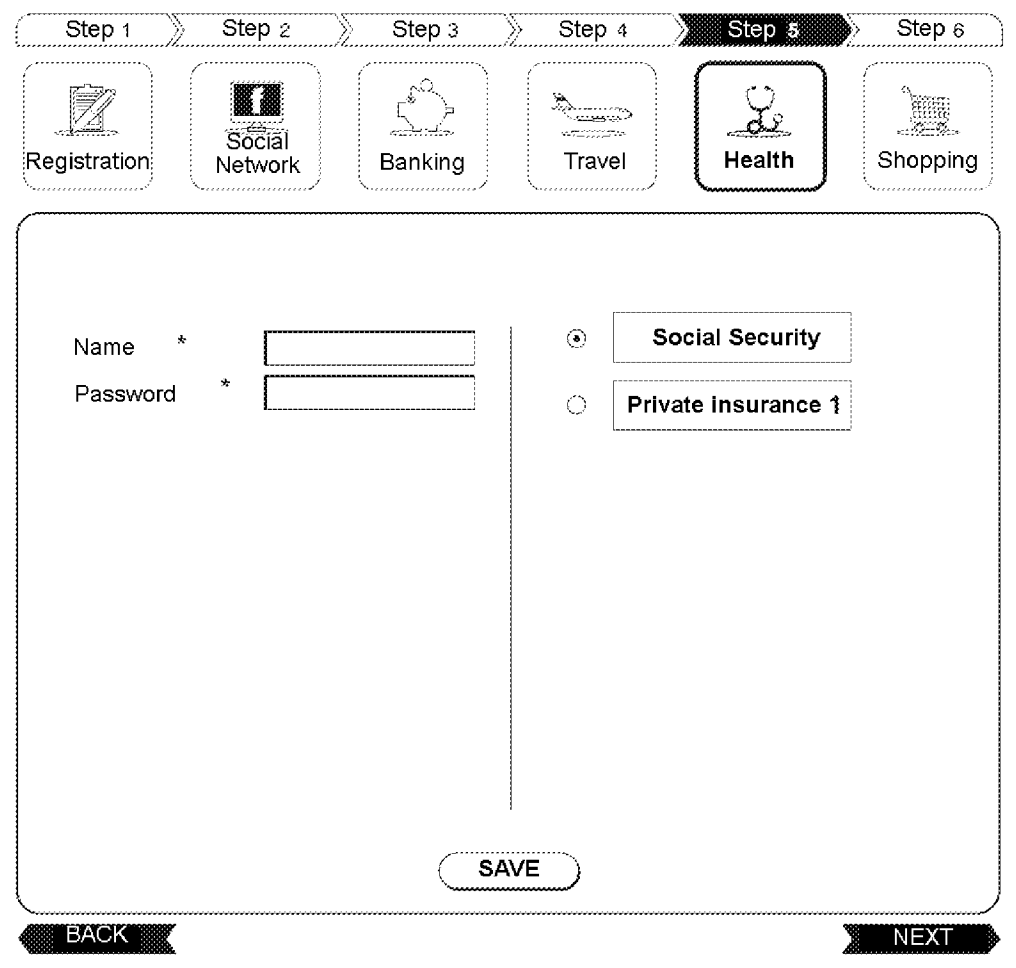
Figure 3F:
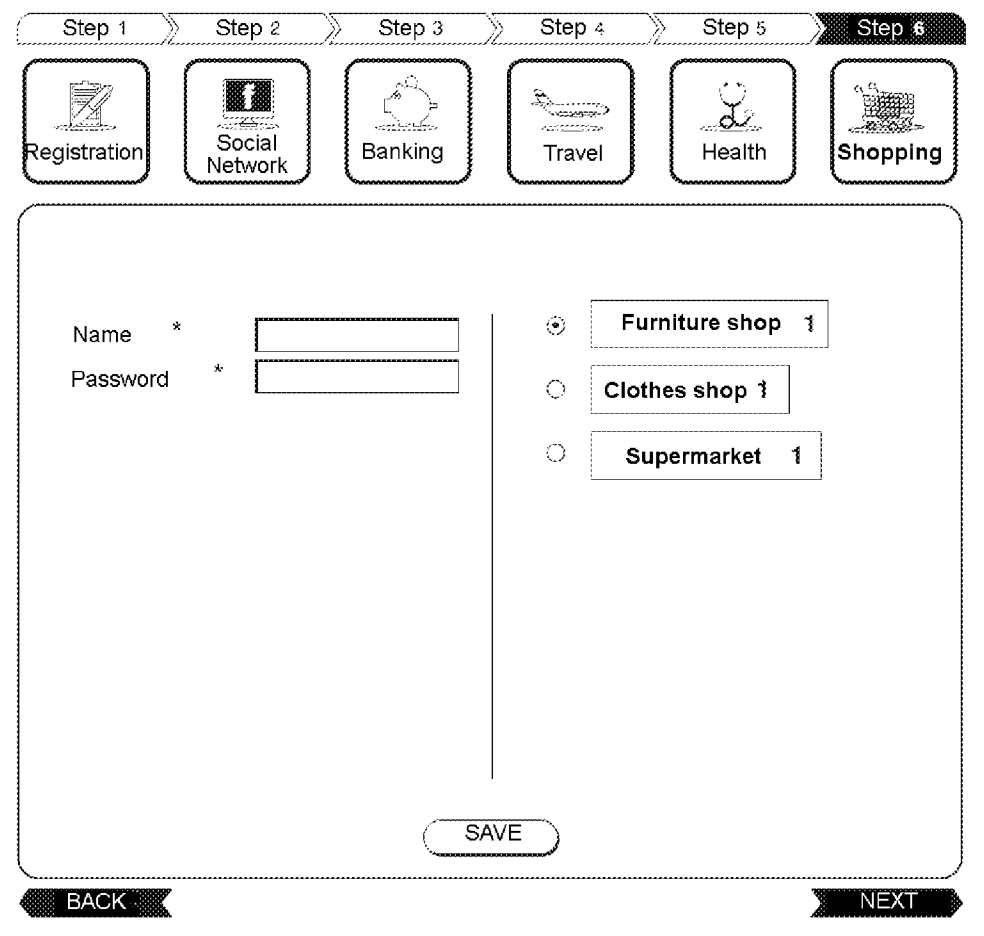

Personal data is requested in the first display which he/she can voluntarily input (FIG. 3A). Next he/she is shown a display for introducing the data of one or several social networks (FIG. 3B), followed by a display for inputting banking data (FIG. 3C), then flight data (Figure and so on and so forth (for example health data in FIG. 3E and purchase data in FIG. 3F). A diagram is shown at all times in the upper part in which the progress through the forms is seen.

3.—In one embodiment, no functionality is provided to the system from the home display. There is only access to the sequence of forms for adding and/or modifying information.

4.—In another embodiment, the user can be redirected to a timeout display from any position in the event that he/she is inactive for too long. The initial display can only be accessed from this display.

Statistics

In one embodiment, the system gathers metrics, which are made available to third parties as statistics. The statistics are pre-calculated, with daily grain level, such that when being viewed, the tables where they are stored only need be consulted. Performing calculations when the statistics are requested is thereby prevented, thus limiting the impact on the database (DB) and improving the performance of the interface.

The following must initially be contemplated:

No. of times each action has been performed for each third party.

No. of times each action has been OK/KO.

Privacy

In one embodiment, due to the very nature of the system, a user can trigger actions which require accessing and using the information of another user. For example:

"I want to make a transfer to my brother", entails accessing the other person's bank information.

Three measures are taken in the same or various embodiments to prevent misusing third party information:

1.—When one user generates a relationship with another user of the system, an e-mail is sent to the affected user so that he/she can confirm this fact.

2.—When one user performs an action triggering the access or use of information of another user, an e-mail is sent to the affected user so that he/she can confirm that he/she accepts the action.

3.—A user can access at all times a table in which their relationships are shown, and he/she can unilaterally eliminate a relationship.

Embodiments; Data Exchange Flow

Thus, in one embodiment the steps would be the following, as shown in FIG. 2:

1.—The user makes a request by voice: "I want to perform a transfer to my brother". A voice-to-text recognition is performed by the message input and recognition system (Input) which the front-end (F) receives.

2.—In this example the dialogue system (DS) is available remotely and the user accesses it through the Internet or another type of network (W). The front-end (F) sends the request to the dialogue system (DS) so that it analyses it.

3.—The dialogue system (DS) indicates that it needs the following data: source account No., destination account no., user and password of the client of the bank, and name and data of the payee. They are requested from the management system (MS).

4.—In this embodiment, the management system (MS) accesses the Cassandra-type database (DB) to retrieve the information. It finds all the data except the name of the payee and his/her data.

5. The management system (MS) returns the data found to the dialogue system (DS).

6. The dialogue system (DS) emits a response requesting the data of the payee.

7. The web page (W) transmits the response to the user

8. The user introduces the data of the payee (his/her brother).

9. The front-end (F) transfers the information to the dialogue system (DS).

10. The dialogue system (DS) indicates the tax identification code of the payee to the management system (MS).

11. The management system (MS) stores it in the database (DB).

12. The dialogue system (DS) orders the management system (MS) to perform the transaction with all the information 13. The management system (MS) uses the connector of the bank (C1) to perform the operation. In various embodiments, the connector (C1) can be an adhoc connector developed for the bank, or the affiliations connector (Cn) of generic use for those third parties which are affiliated by means of an offered API.

14. The management system (MS) notifies the dialogue system (DS) as to the success or failure.

15. The dialogue system (DS) returns a response.

16. The web page (W) displays it to the user.

In another embodiment of the invention, the following steps are followed:

1.—The user introduces a written message in his/her mobile terminal (D): "I want to send flowers for his/her birthday."

It goes to the front-end (the front-end can be remote as depicted in FIG. 1 or local).

2.—The message is sent to the dialogue system (DS), which analyses the message: natural language processing and semantic system.

The following concepts are extracted:

i. What article: Flowers.

ii. To whom: unknown iii. When: on his/her birthday

3.—The information is passed on to the management system (MS)

4.—The management system (MS) consults in the database (DB) and detects the absence of a piece of data for performing the transaction.

5.—The management system communicates it to the dialogue system (DS).

6.—The dialogue system (DS) asks for the piece of data, generating a response in the form of a question for the user:

7.—The following question is presented to the user: "To whom do you want to send flowers?", it can be in text or TTS format.

8.—The user input the piece of missing data, it can be by voice or text "To my girlfriend".

9.—The information is sent to the dialogue system (DS) which identifies the information and extracts the concepts:

iv. Which article: flowers.

v. To whom: to my girlfriend vi. When: on her birthday

10.—The necessary information which needs to be extracted from the database (DB) is sent to the management system (MS)

11.—All the necessary information is identified in the database (DB): (if it is not in the database (DB) the system will ask the user again)

a. Who the girlfriend is:

vii. Her address viii. Her tastes (in flowers)

ix. Date of birthday b. Data:

x. Account/card number (for example of a bank which is connected by means of the connector system (C1-Cn) or not), or xi. Log-in and password of the florist (if there is more than one shop in various embodiments the user is given a choice or if it is saved in the preferences history, it will have stored which is liked or where he/she usually purchases).

13.—The purchase is made with the connector (Ci) of the florist. As indicated, more than one connector can interact (the one of the bank and the one of the florist) for carrying out the transaction. In one embodiment, for security, the application installed in the mobile (M) terminal (D) or from the web page (W), a method of identification is requested, for example password, fingerprint, etc. or by means of a system of voice or fingerprint recognition, to complete the transaction.

16.—It returns the success or failure of the operation (it is possible that the card is invalid and it reports the possibility of paying in another manner (another method of payment) Paypal-type, etc.)

Other Embodiments

In one embodiment, the number of third party services which the system integrates is not limited. Thus, all the third party services (C1, . . . , Cn) connected to the integrated payment or data consulting system can be integrated, for example, by means of an API provided from the system and with access by the management system (MS). In one embodiment, each connector (Ci) is in the form of an open API suitable for any remote third party service provider to connect with the system by means of an application compatible with said API.

As indicated in one embodiment, the message input and recognition system (M) is suitable for being executed in the user mobile terminal (D). In another embodiment, the message input and recognition system (M) is downloaded and installed in the mobile terminal (D) of the user, preferably a mobile telephone. And in another embodiment the message input and recognition system (M) comes pre-loaded in the user mobile terminal (D) when the user acquires it. Preferably this device or mobile terminal (D) is a mobile telephone, although in other embodiments the mobile terminal is also a Smartphone, a tablet, an eBook, a netbook, a laptop, etc.

In another embodiment, accessing the message input and recognition system (W) is done remotely by means of a communications network from a mobile terminal (D), preferably a mobile telephone. In one embodiment, remote access in this case is by means of a web page (W).

In a particular embodiment, the system further comprises communications with at least one personal remote administrator (not shown) with access to the management system (MS). Thus, there is the option of the personal remote administrator interacting with the user accessing the system at least in the event of user doubt, in the event of dialogue system (DS) error or in the event of transaction failure.

In the event that not all the necessary data for carrying out the user request are present, this data will be requested from the user, who inputs it in spoken (by voice) or written (by text) form or by the mentioned forms of inputting requests. In one embodiment, this unavailable necessary data input by the user is stored by the management system (MS) in the database (DB) for future requests.

Services

In the present invention, the name third party services is comprised within purchasing electronic tickets for accessing services (flights, shows, cinema, . . . ), consulting the balance in a bank account (in a card, in a gambling web page, . . . ) and purchasing products (clothes, accessories, flowers, books, also electronic books, music, . . . ). All third party services which are susceptible to being provided remotely, such as for example requesting a doctor's appointment, courses, e-learning, vehicle rental, job offer searches, systems operation, receiving information, etc., are included in this list. A list with the services available in various embodiments is provided below.

Thus, among the transaction services the following are available:

A) Use of the Internet, functionalities:

Performing transactions (electronic commerce environment):
  Bookings (hotels, restaurants, shows) and accommodation
  Consulting and purchasing tickets
  Online check-in for trips
  Re-sending invoices
  Purchasing tickets (for example in Ticketmaster, etc.)
  Booking/paying a taxi
  Purchasing (including from the shopping list):
    Books/magazines (physical or digital, magazine subscriptions)
    Consumer electronics
    Software
    Music
    Telephony
    Videos/DVD
    Food
    Chemist/perfumeries
    Clothes (including physical and only online stores)
    Sport, purchasing clothes and accessories
    Purchasing perfumes and chemist
    Purchasing clothes and sporting accessories or those of any other type.
    Internet services
    Mobility services
    Purchasing and/or sending flowers and/or gifts
    Controlling and/or programming systems for Smart Cities.
Performing transactions (personal banking environment):
Consulting balance
Account statement
Bank transfers
Direct billing
Payment, consulting bills and Social Security
Mobile top-up
Taxes
Purchasing and selling securities
Consulting Securities
Tax information
Purchasing bank products
Buying-selling securities
Simulators
In other embodiments, in the bank environment the following functions and/or information requests are also performed:
  Transactions by date
  Transactions by amount
  Monthly statement
  Detailed overall standing
  Graphic overall standing
  Direct billing bills
  Non-direct billing bills
  Transfers made
  Transfers received
  Existing periodical transfers
  Listing of deferred transfers
  Conveyances made
  Existing alerts
  Paying non-direct billing bills
  Ordering not to pay bills
  Cancelling order to not pay bills
  Returning a bill
  Modifying bill account
  Specific transfer
  Periodic transfer Maintaining periodic transfers
Deferred transfer
Maintaining deferred transfers
Specific conveyance
Periodic conveyance
Existing alerts
Consulting account and card transactions
Specific transfer
Consulting balance
Personalization of accounts
Card statement
Consulting funds available
Consulting card
Consulting transactions
Transfers
Bill operations
Returns
Card operations
Paying into financial products
Stock operations
Current status
End of month status
Contracting accounts
Account transactions
Transaction search-engine
Account detail
Transactions by income and expenses
Checks deposited
Simulation of account liquidation
Requesting a check-book
Checks
Promissory notes
Auto-checks
Card transactions
Card details
Purchases by type of store
Conveyance to credit from card
Postponing a purchase
Consulting a purchase
Pre-paying a purchase
Cancelling purchase
Contracting secure purchase services
Consulting/modifying secure purchase service
Cancelling registration with secure purchase service
Information about secure purchase service
Signing-up for a card
Activating a card
Cancelling card operations
Conveyances between own accounts
Transfers
OMF transfers
Consulting transfers
Cancelling transfers
Requesting international transfer
Consulting international transfers
New deferred transfer
Consulting deferred transfer
New periodic transfer
Modifying periodic transfer
Reactivating periodic transfer
Consulting periodic transfer
Cancelling periodic transfer
Cancelling next periodic transfer
Eliminating periodic transfer
Making a transfer order
Consulting/cancelling an existing transfer order
Topping-up mobile telephone
Collecting taxes
Consulting/cancelling a collection
Consulting direct billing bills
Modifying direct billing bills
Paying non-direct billing bills
Consulting non-direct billing Bills
Consulting remittance of bills presented
Consulting unpaid bills by remittance
Consulting unpaid bills by date
Value of main unpaid bills
Main drawees
Transmitting files
Status of files
Depositing checks
Bills seen by groups
Bills seen individually
Maintaining principals
Signing-up for bills
Management of remittance
Maintaining drawees
Wages/salary paid
Transfers of files
Issuing confirming orders
Maintaining confirming providers
Managing confirming remittances
Issuing orders—Payment to providers
Maintaining providers
Managing remittances—providers
Credit advances. Providers
Receiving files. Providers
Consulting term savings
Modifying term savings
Cancelling term savings
Simulating term savings
Signing-up for term savings
Cancelling term savings
Term savings operations
Consulting term savings transactions
Signing-up for investment funds
Additional subscription—investment funds
Partial refund—. Investment funds
Conveyance between investment funds
Cancelling investment fund operations
Consulting investment fund transactions
Consulting investment fund asset value and return
Signing-up for pension/social security plan
Making large contribution to pension/social security plan
Signing-up for regular contributions to pension/social security plan
Modifying regular contributions to pension/social security plan
Managing pension/social security plan gifts
Making transfers between pension/social security plan
Consulting transfers between pension/social security plan
Cancelling transfers into a pension/social security plan
Cancelling contributions into a pension/social security plan
Cancelling pension/social security plan contracts
Purchasing certificates—securities
Purchasing certificates a la carte
Selling certificates
Selling certificates a la carte
Alphabetical securities search engine
Consulting and modifying securities orders
Consulting securities portfolio
Modifying direct billing account for securities account
Signing-up for a securities account OPV's
Choosing cash dividend
Subscribing to a public offer
Subscribing to dividend reinvesting
Market information
Securities operating commissions
Consulting loan details and conditions
Partial amortization simulation
Complete amortization cancellation simulation
Partial amortization
Complete amortization cancellation
Advanced tax amortization information
Amortization timetable
New loan amortization simulation
Cancelling amortization operations
Signing-up for sending correspondence by e-mail
Modifying e-mail correspondence addresses
Blocking/un-blocking online correspondence
Cancelling registration in online correspondence
Income
Contracting mobile alert service
Consulting mobile alert service
Modifying mobile alert service
New mobile alert services
Cancelling registration in mobile alert services
Cancelling mobile alert contract
Automobile insurance
Virtual agency
Types of interest
Currency exchanges
Bank guide
Electronic statement
Calculator
Signing-up for value account
Signing-up for term savings account
Signing-up for account
Signing-up for net banking
Signing-up for investment fund
Signing-up for pension/social security plans
Cancelling contract operations
Trading points And the additional services available in various embodiments of the invention to be combined with at least one transaction service include the following:

B) Use of Internet, functionalities:
E-mail
Audio/video conferences, for example via Skype
Providing information and/or integration and/or interaction (for purchase/sale, booking and/or obtaining information or other event) with the following systems example and/or embodiment of the following systems:
  Search-engines (including based on geographic localization)
  Hospitals, medical centres (including online consultation)
  Virtual doctors
  Booking an appointment with different organisations or systems
  Obtaining information and interacting with respect to weather
  Obtaining and interacting with local information
  Obtaining and interacting with information on films in cinemas (listing, purchasing tickets, etc.)
  Information about, purchasing and booking events
  Information about, purchasing and booking events (theatre, cinema, sporting events, cultural events).
  Information about restaurants, bars or leisure.
  Booking restaurant (opentable, restalo, etc.)
  Information/calling a taxi
  Information on addresses and telephones
  News information
  Value of shares (banking)
  Exchange rate
  Information on people
  Information on businesses
  Information on things
  Information on places and monuments
  Tourist information
  Information on the time in different places
  Listening to, recording or interacting with music or with systems such as goear, spotify,
  Information on TV listings
  Information on recipes
  Information on museums and purchasing tickets.
  Information about and contracting tradesmen
  Information on song lyrics
  Information on films
  Information on transport timetables
  Information on sporting results (football, basketball, races, . . . )
  Information on nutrition
  Information for translating, writing in another language
  General information found on web sites such as Wikipedia
  Meaning searches
  Concept searches
  Word searches
  Multilingual searches
  Searches for images (by name, type, form, colour, etc.)
  Searches for videos (by type, text, locution, etc.)
  Searching for news with translation
  Purchasing in department stores
  Information which is on the Internet and/or in any other network
  General information which is in any intranet and/or extranet
  Any other type of information
  Jokes
  Search in job interaction
  Search and interaction with candidates
  Web calculators and converters
  E-learning
  Teaching in general
  University systems
  Systems for Smart cities
  Translation
  Writing
  Managing means of transport on intelligent motorways
  Controlling and interacting with smart clothes, footwear and accessories
  Controlling and interacting with video consoles or any device or/and gamming software
  Purchase, sale and/or management of gambling:
    Casino game
    Board games
    Sporting bets
  All types of gambling in any type of environment
  Consulting and/or interacting and playing with role-playing games
  Consulting and/or interacting and playing with clairvoyants
  Consulting and/or interacting with dating system Activity and interaction in, and with, social environments, including social dialogue:
    Facebook (posting comments, sending previously informed congratulations, . . . )

Twitter (posting comments)
Tuenti
Google+
Linkedin
Any social network
Searching for videos in Youtube, vimeo, Google video, etc.
Chat of any provider
C) Use only of functions in the event of the mobile terminal (D) being a smartphone and/or computing devices, computers or any type of device:
  Dialogue social
  Sending e-mails
  Reading e-mails
  Writing emails
  Sending/receiving SMS (for all types of telephones), MMS, or other types of messages
  Planning meetings
  Finding a contact
  Setting an alarm/a timer
  Adding reminders
  Managing the contact list
  Making calls and/or video calls
  Playing stored music
  Managing and interacting with the contact list
  Managing and interacting with tasks
  Writing any type of message
  Interacting with stored addresses and storing them
  Asking broad questions and obtaining responses
  Opening applications (commands)
D) Functionalities (domotics):
  Activating/de-activating and/or programming heating
  Activating/de-activating and/or programming air conditioning
  Activating/De-activating and/or programming dishwasher
  Activating/de-activating and/or programming washing machine
  Activating/de-activating and/or programming sockets
  Activating/de-activating and/or programming robot vacuum cleaner
  Activating/de-activating and/or programming cleaning robot
  Activating/de-activating and/or programming television
  Activating/de-activating and/or programming recorder multimedia
  Activating/de-activating and/or programming audio
  Activating/de-activating and/or programming dinner scenario
  Activating/de-activating and/or programming film scenario
  Activating/de-activating and/or programming sleep scenario
  Consulting irrigation system
  Consulting blinds
  Consulting status and/or closing and opening windows
  Consulting status and/or closing and opening doors
  Consulting garden status
  Consulting house interior status
  Consulting and/or controlling and/or programming temperature
  Consulting and/or controlling and/or programming garden humidity
E) Sensors (activating, de-activating and/or programming):
  Temperature
  Lighting
  Garden humidity
  Water leaks
  Smoke and gas
  Opening doors
  Opening windows
  Outdoor presence
  Indoor presence
  Electric fault detector
  Correspondence detector
  Detector of calls with entryphone with camera
  Camera detector
F) Actuators (domotics) activating, de-activating and/or programming:
  Climate control
  Blinds
  Watering
  Domestic appliances
  Simulation of inhabited dwelling
  Lighting of the dwelling or of the site
  Emergency lighting
  Garden lighting
  Alarm clock
  Medical emergencies
  Alarm
  Agreed telephone warnings
  Acoustic warning device
  Luminary warning device
  Police warning device
  Monitors
  Television sets
  Equipment multimedia
G) Consulting and/or purchasing products or services for airlines or transport:
  Informing (Module P&R)
  Consults flight status or means of transport
  Online check-in
  Consulting connections
  Route and flight information or means of transport
  Flight information timetable
  Requesting an invoice
  Invoicing ticket
  Requesting confirmation e-mail
  Searching for flights or means of transport
  Method of paying for the ticket
  Modifying booking data
  Car rental
  Booking hotel or accommodation
  Parking rental
  Additional services
  Information about city of destination
  Registering in the loyalty programme
  Registering in Group sign-up
  Purchasing tickets for groups
  Changing flight
  Assigning seat
  Purchasing insurance
  Advanced passenger information
  Managing blocking
  Adding packs
  Customer service
  Sending bills
  Confirming bookings
  Purchasing tickets Embodiments of the System Interacting with a Mobile Terminal (D)

Figure 4A:
FIG. 4A-4F show embodiments of the displays shown by the service when using the different connectors in the information exchanging system for exchanging information with third parties.

FIG. 4A shows an example of a display in a mobile terminal (D) when accessing the system. FIG. 4A shows an example in which it is possible to access 4 services: Trips, Banking, Purchases and Health.

Figure 4C:
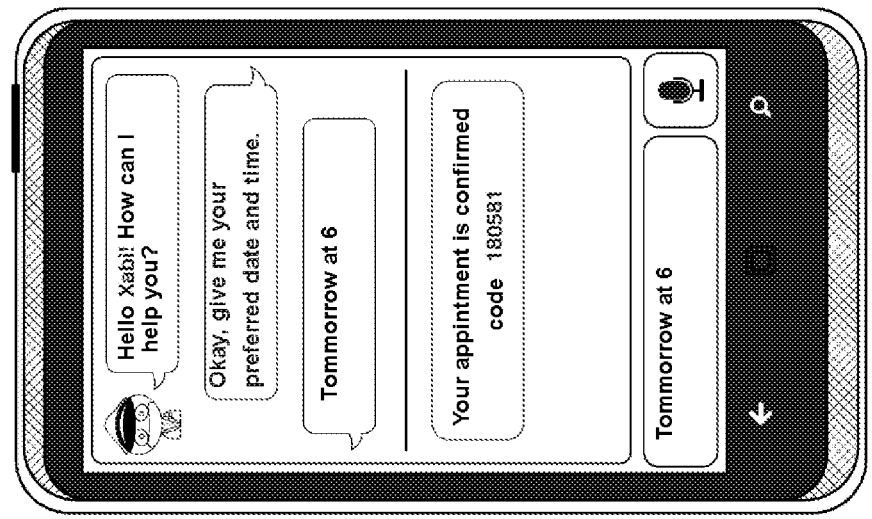
Figure 4B:
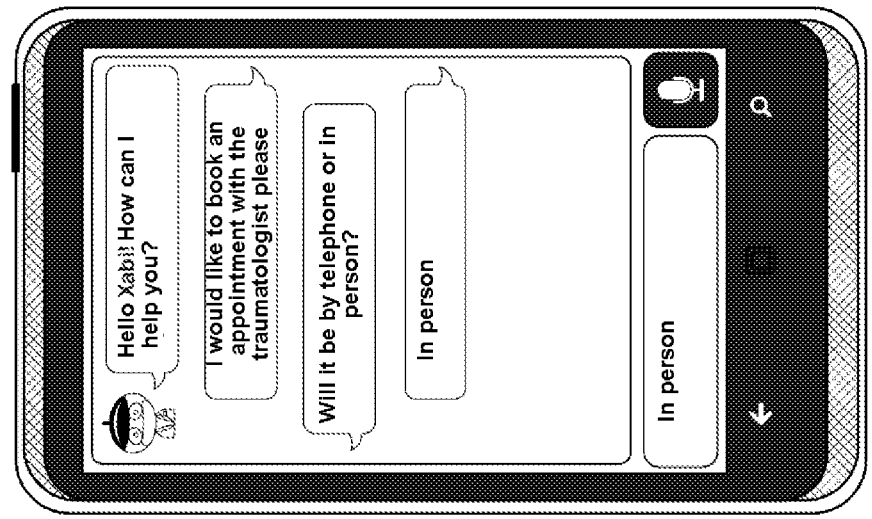

FIGS. 4B and 4C show the case of accessing the Health service. The user types in that he/she wishes to make an appointment. The system processes it, and after analysing it types a response in which he/she is asked to choose between two options (if the appointment will be by telephone or in person). The user responds and finally the appointment is made.

Figure 4D:
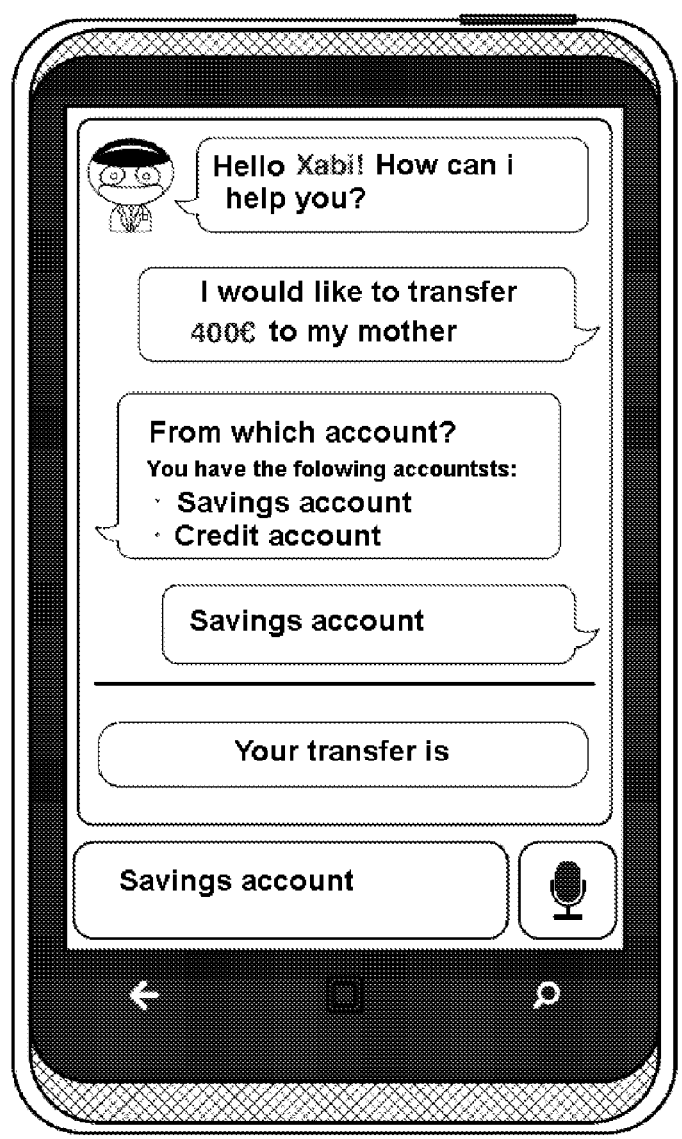

FIG. 4D shows the example in the case of selecting Banking. It is also seen that it is not necessary to input the data about the mother, since the system already has it. If the system did not have it or was missing any piece of data, it would request it from the user.

Figure 4E:
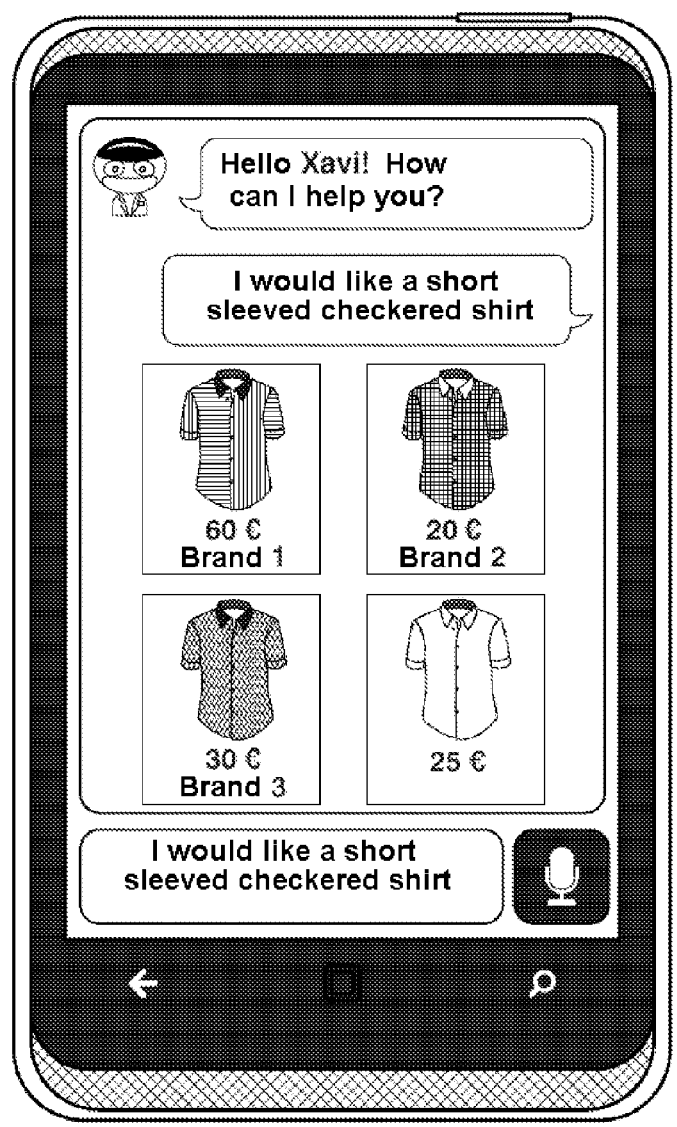

FIG. 4E shows an example in the case of selecting Shopping. In this example the user can select the shirt he/she likes in a touch-sensitive manner and the system is in charge of providing all the data for the purchase.

Figure 4F:

FIG. 4F shows the example in the event of selecting Trips. The different possibilities of flights are offered according to the sentence input by the user.

The invention claimed is:

1. A system of integrating remote third party services comprising:
   a. a management system (MS) connected to a communications network,
   b. a database (DB) managed by the management system (MS) for maintaining and storing at least the following tables:
      a table of users,
      a table of data associated with each user, among which high-level information such as account number and social information is distinguished,
   c. a message input and recognition system (Input) connected to said communications network for access of at least one user, with capacity to access the management system (MS) for requests input by the user,
   d. an output system (Output) suitable for at least communicating information to the user or for carrying out actions from a user request,
   e. a dialogue system (DS) connected to the management system (MS), wherein the dialogue system (DS) comprises at least one system for interpreting messages, recognising actions to be performed and producing responses given a request input by the user, and
   f. at least one information exchanging system for exchanging information with remote third party services (C1-Cn), wherein the information exchanging system is connected to the management system and comprises at least one connector (Ci) suitable for each type of service such that at least one connector is suitable for performing a commercial transaction that can be requested by the user.

2. The system according to claim 1, wherein the system further comprises a local front-end (F) in an application in the mobile or remote terminal (D) suitable for intercepting requests and/or displaying responses to the user and/or operating a system and/or performing an operation, purchasing a product or service or obtaining information.

3. The system according to claim 1, wherein the message input and recognition system (Input) is suitable for receiving from the user written messages, voice messages, NFC, facial recognition, augmented reality, bar or bi-directional code, touch message, giving rise to a user request.

4. The system according to claim 1, wherein the connector (Ci) is in the form of an open API or a communications standard or protocol or semantic Web standard defined by W3C, suitable so that any remote third party service provider can connect with the system by means of an application compatible with said API or said communication or semantic Web standard.

5. The system according to claim 1, wherein the commercial transaction that can be requested by the user from a remote third party service is comprised between purchasing electronic tickets for accessing services or purchasing services on a pay for use or license basis, the payment and/or exchange or transfer between bank or non-bank accounts (Paypal® type accounts) and purchasing products.

6. The system according to claim 5, wherein remote third party services for which there is a connector (Ci) are comprised between consulting the balance in a bank account, requesting information, consulting a virtual doctor, executing actions, for example relating to domotics or to locating the user.

7. The system according to claim 1, wherein the message input and recognition system (Input) is suitable for being executed in the mobile terminal (D) of the user.

8. The system according to claim 7, wherein the message input and recognition system (Input) comes pre-loaded in the mobile terminal (D) of the user.

9. The system according to claim 1, wherein the message input and recognition system (Input) is downloaded and installed in the mobile terminal (D) of the user.

10. The system according to claim 1, wherein access to the message input and recognition system (Input) is done remotely by means of a communications network from a mobile terminal (D).

11. The system according to claim 1, wherein the system further comprises communication with at least one personal remote administrator with access to the management system (MS).

12. A method of integrating remote services carried out in a system comprising:
   a. a management system (MS),
   b. a database (DB) managed by the management system (MS) for maintaining and storing at least the following tables:
      a table of users,
      a table of data associated with each user, among which high-level information such as account number and social information is distinguished,
   c. a message input and recognition system (Input) connected to said communications network for access of at least one user, with capacity to access the management system (MS) for requests input by the user,
   d. an output system (Output) suitable for at least communicating information to the user or for carrying out actions from a user request,
   e. a dialogue system (DS) connected to the management system (MS), wherein the dialogue system (DS) comprises at least one system for interpreting messages, recognising actions to be performed and producing responses given a request input by the user,
   f. at least one information exchanging system for exchanging information with remote third party services (C1-Cn), wherein the information exchanging system is connected to the management system (MS) and comprises at least one connector (Ci) suitable for each type of service such that at least one connector (Cj) is suitable for performing a commercial transaction that can be requested by the user and, wherein the method comprises the following steps:
- the user inputting a message in a mobile terminal (D),
- the message input and recognition system (Input) recognising the message and transferring it into written text,
- the dialogue system (DS) interpreting the message input by the user and the data necessary for execution,
- the management system (MS) identifying availability of necessary data in the database (DB),
- in the event of non-availability of any piece of data:
  - the management system (MS) communicating the unavailable necessary data to the dialogue system (DS), where appropriate,
  - the dialogue system (DS) requesting the additional input of the unavailable necessary data from the user,
  - the user inputting the unavailable necessary data in the mobile terminal (D) in a manner that is spoken or written by the user,
- the management system (MS) performing the transaction, either executing and paying for or consulting a service requested in the message input by the user using the data of the database (DB) and the data input by the user, and the dialogue system (DS) notifying the user of the transaction success or failure.

13. The method according to claim 12, wherein the message input and recognition system (Input) is further suitable for being executed in a mobile terminal (D) connected to said communications network.

14. The method according to claim 12, wherein the message input and recognition system is further suitable for being executed remotely from a mobile terminal (D).

15. The method according to claim 12, wherein the unavailable necessary data input by the user is further stored by the management system (MS) in the database (DB) for future requests.

16. The method according to claim 12, characterised in that the system further comprises communication with at least one personal remote administrator with access to the management system (MS) and therefore the method comprises the additional step of the personal remote administrator interacting with the user accessing the system at least in the event of user doubt, in the event of dialogue system (DS) error or in the event of failure of the transaction or action to be performed.

* * * * *